United States Patent Office 3,392,108
Patented July 9, 1968

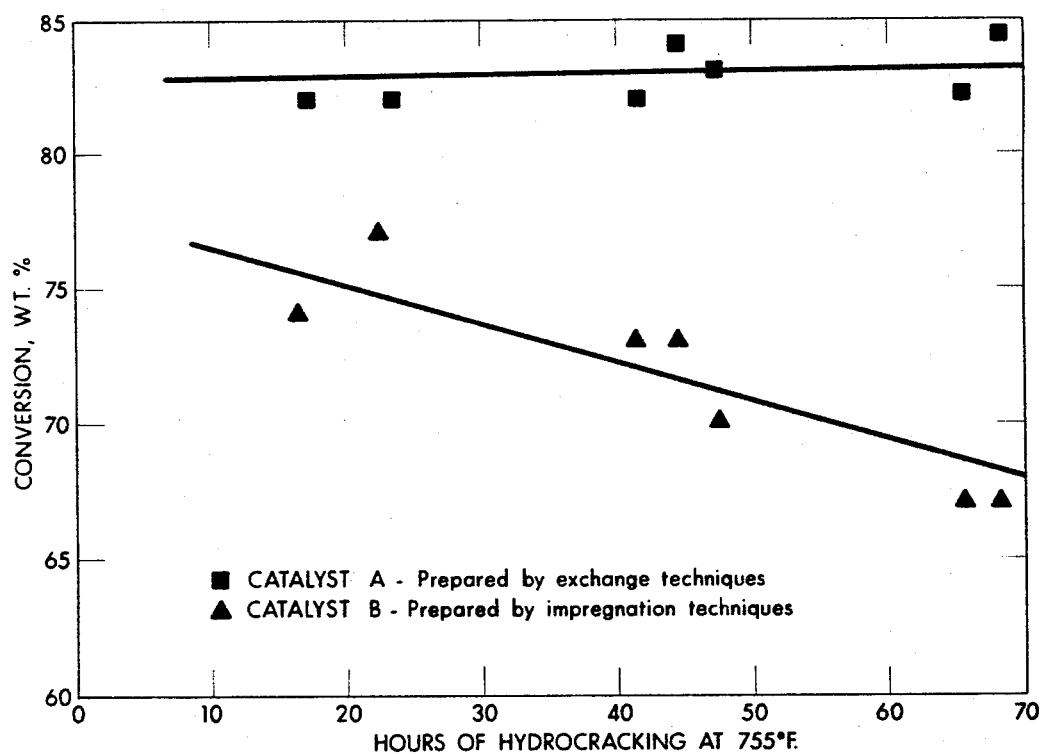

3,392,108
PROCESS FOR PREPARING MIXED NONNOBLE METAL CATALYST COMPOSITIONS AND PROCESSES UTILIZING SAME
Roland Burgess Mason, Denham Springs, and Glen Porter Hamner, Baton Rouge, La., assignors to Esso Research and Engineering Company, a corporation of Delaware
Continuation-in-part of application Ser. No. 538,222, Mar. 29, 1966. This application Mar. 13, 1967, Ser. No. 622,482
17 Claims. (Cl. 208—111)

ABSTRACT OF THE DISCLOSURE

An improved technique for preparing catalyst compositions particularly useful in hydrocarbon conversion processes wherein a catalyst support base having ion-exchangeable sites is exchanged with a first nonnoble metal and the resulting composition is then treated with a second nonnoble metal which is in an opposite valence form with respect to the first nonnoble metal and which is reactable with the aforesaid first nonnoble metal to yield a mixed nonnoble metal compound at the ion-exchangeable sites of the catalyst support material. For example, a crystalline aluminosilicate zeolite molecular sieve, preferably in the ammonium form, is ion exchanged with nickel cations and the resulting nickel ammonium zeolite is treated with a solution of ammonium tungstate to yield a nickel tungstate on ammonium zeolite. This material is a superior hydrocarbon conversion catalyst.

CROSS-REFERENCES TO RELATED APPLICATIONS

This application is a continuation-in-part of Ser. No. 538,222, filed Mar. 29, 1966, entitled, "Hydrocracking Catalyst Compositions and Processes."

BACKGROUND OF THE INVENTION

The present invention concerns improved catalyst compositions for use in petroleum conversion reactions. In particular, the present invention concerns mixed nonnoble metal catalysts which show unexpectedly high activity in petroleum hydrocarbon conversion reactions occurring in the presence of an added reducing gas, such as hydrogen. More specifically, the present invention relates to a technique for preparing catalyst compositions wherein a catalyst support material having ion-exchangeable sites is exchanged with a first nonnoble metal and the resulting nonnoble metal-exchanged catalyst is treated with a second nonnoble metal which is in an ionic charge state opposite to that of the exchangeable nonnoble metal whereby a catalytically active composite of both nonnoble metals is formed at the ion-exchange sites of said catalyst support material.

The nonnoble metals which may be introduced by ion exchange into catalyst support materials having cation-exchange sites include the metals of Groups I-B, II-B, and the nonnoble metal constituents of Group VIII. The nonnoble metals which may be introduced by ion exchange into catalyst support materials having anionic-exchange sites include the oxides and sulfides of metals in Groups V-B and VI-B. Catalyst support materials having cation-exchange sites include aluminosilicate zeolites (both amorphous and crystalline), cation-exchange resins, and oxidized char materials containing ion-exchange sites.

The mixed nonnoble metal catalyst composites of the present invention are useful in hydrocarbon conversion processes which require catalysts having a substantial hydrogenation-dehydrogenation activity. These processes include, for example, hydrocracking, hydroforming, hydroisomerization, hydrotreating (both for desulfurization and denitrogenation), hydrodealkylation, disproportionation, hydrogenation, and other related reactions.

It has been known in the art to utilize mixed metal catalyst compositions in various hydrocarbon conversion processes. The early catalyst utilized for this purpose comprised an amorphous catalyst base, such as alumina, which was impregnated with the desired combination of metals in the form of sulfides or oxides. The metal components were generally introduced into the amorphous support material by wet impregnation of the support with a water-soluble compound of the desired metal or metals. An example of such technique is to be found in U.S. Patent Number 2,840,529 and further with respect to mixed metal amorphous catalysts in U.S. Patent Number 2,983,-691. It has also been known to coprecipitate two or more metals from an aqueous solution onto an amorphous support, such as silica-alumina, to prepare catalyst compositions which are useful in hydrocarbon conversion. In this regard, see U.S. Patent Number 3,147,208 and also U.S. Patent Number 3,073,777.

It has additionally been known to utilize crystalline aluminosilicate zeolites as catalyst base materials for mixed metal hydrogenation components. U.S. Patent Number 3,259,564 discloses a crystalline synthetic mordenite zeolite which is treated by cation exchange with various metals and then is subsequently treated with a noble metal, i.e., a platinum group metal to deposit the latter metal thereon. Other crystalline aluminosilicate zeolites have been used as catalyst support materials. For example, in U.S. Patent Number 2,983,670 a type 13X molecular sieve was impregnated with combinations of metals in Groups V-B, VI-B, VII-B and VIII-B by treating the sieve with aqueous solutions of the desired metal compounds. The condition selected for impregnation resulted in little or no exchange of the lattice ions. Both patents relating to mixed metal-containing zeolites disclose the use of such compositions in hydrocarbon conversion processes. A specific disclosure of the use of a mixture of a Group VI and a Group VIII metal on a crystalline aluminosilicate is given in U.S. Patents 3,159,564 and 3,265,610. There is no teaching in these patents with respect to the manner in which these metals are introduced onto the molecular sieve carrier.

SUMMARY OF THE INVENTION

The present invention relates to an improved process for preparing mixed nonnoble metal catalyst compositions. Previous techniques utilized in the art for preparing mixed metal catalysts involved the use of either multiple impregnation techniques wherein a catalyst support material was treated with aqueous solutions of soluble compounds of the desired metals or, alternatively, the art employed either single or multiple cation-exchange methods to introduce certain metals into the ion-exchange sites of specific catalyst support materials, such as the crystalline aluminosilicate zeolites.

It has now been found and, as such, forms the basis for the present invention, that superior mixed monnoble metal catalysts can be prepared by utilizing a combination of an ion-exchange step, wherein a first nonnoble metal component is introduced into the ion-exchange sites of the catalyst support material followed by a treating step. In the treating step the ion-exchanged catalyst is contacted with a solution containing a second nonnoble metal which is in the opposite valence form than the metal introduced by ion exchange. A mixed nonnoble metal composite is believed to be formed at the ion-exchange sites of the catalyst support material due to a chemical interaction between the two aforesaid nonnoble metals.

By utilizing the preparative process of the present invention, it is possible to obtain a catalyst composition having the mixed nonnoble metal component present in a highly dispersed form. This results in superior catalyst activity, selectivity and resistance to deactivation due to the presence of catalyst poisons in the feed stream when such catalysts are compared with catalysts of similar gross composition but which are prepared by conventional techniques known to the art.

DESCRIPTION OF THE PREFERRED EMBODIMENT

The nonnoble metals which may be utilized in the practice of the present invention can most conveniently be assembled into two groups for the purpose of characterization. The first of these groups contains those metals which are normally in the cationic form in solution. Included in this group are the metals of Groups I–B, II–B and the nonnoble metal members of Group VIII of the Periodic Table (Handbook of Chemistry and Physics, 38th edition, Chemical Rubber Publishing Company). Particularly desirable cationic metals include copper, zinc, cadmium, mercury, iron, cobalt and nickel. Most preferred metals for use as the cationic component include zinc, cobalt and nickel.

When the catalyst support material being used has cation-exchange sites then the aforementioned nonnoble metals may be utilized to effect ion exchange in the aforesaid support as the first step in the present process. The ion-exchange procedure which may be utilized is one well known in the art and involves contacting the catalyst support material with an aqueous solution of the desired metal compound, e.g., as the chloride, nitrate, etc., so as to replace at least a portion of the cations which were previously associated with the cation-exchange site of the catalyst support material. Multiple exchanges may be utilized to increase the total amount of cation sites exchanged.

The second nonnoble metal component comprises those metals which are normally associated in solution with an anionic radical and generally comprise the oxides or sulfides of the metals in Groups V–B and VI–B. The particularly preferred metals from this group comprise molybdenum and tungsten.

When the catalyst support material has cation-exchange sites, it is desirable to first treat such material with a nonnoble metal cationic component as described above. The resulting exchanged catalyst support material is then contacted with either an ammoniacal or alkaline solution of the desired Group V–B or VI–B metal as the oxide or sulfide or mixtures thereof. Since the latter materials are in the anionic form, they will not ion exchange into the catalyst support material but, rather, will interact with the nonnoble metal cation component to form a mixed nonnoble metal catalyst composite at or near the ion-exchange sites on the catalyst support material. It is believed that the ammonium ions which were associated with the anionic nonnoble metal component in solution back exchange onto the cation sites of the catalyst support material to yield the ammonium form of such catalyst. Such back exchange may occur prior to the interaction between the two nonnoble metals and, in fact, may help initiate such interaction by displacing the metal cation component from the catalyst base exchange site.

On the other hand, if the catalyst support material contains anionic-exchange sites, it is desirable in the practice of the present invention to first treat this material with the anionic nonnoble metal component to effectuate ion exchange with the Group V–B or Group VI–B metal which are preferably in the form of an anionic radical such as the oxide or sulfide. This exchanged material is then treated with an aqueous solution of the desired nonnoble metal cation component to yield the mixed nonnoble metal catalyst composite at or near the anionic-exchange sites on the catalyst support material.

By utilization of the above technique, it is possible to obtain a catalyst composition which exhibits at least equal and, in many instances, even higher catalyst activity in hydrocarbon conversion processes as compared with that obtained from the use of a platinum group metal on the same catalyst support material. Whereas the platinum group metals have generally been considered by the art to be the metals of choice for use in most hydrocarbon conversion reactions, the platinum group metals do suffer from a major disadvantage in that they are extremely expensive. Thus, utilization of the improved technique of the present invention to produce catalyst compositions of at least equivalent activity using metals of a substantially lower cost than the platinum group metals results in substantial economic savings in the practice of such hydrocarbon conversion processes. Additionally, catalysts prepared in accordance with the present invention unexpectedly exhibit a high degree of resistance to deactivation due to the presence of catalyst poisons in the feed. This property makes these catalysts the catalyst of choice in the conversion of highly refractory, untreated feedstocks.

The catalyst support materials useful in the practice of the present invention comprise those materials having ion-exchangeable sites associated therewith. For example, for low temperature operations catalyst support materials having cation-exchange sites include cation-exchange resins, such as Amberlite–200 and Dowex A–1 available from The Dow Chemical Company, Midland, Mich. and Amberlyst–15 available from Rohm and Haas Company, Philadelphia, Pa. For operations at somewhat higher temperatures the catalyst supports include oxidized chains having ion-exchange properties and the noncrystalline zeolite known as permutites. The ion-exchange properties of the latter have been demonstrated in water softening operations. Further the catalyst supports include aluminosilicate zeolites, particularly the crystalline aluminosilicate zeolites having uniform pore size commonly described as molecular sieves.

For most hydrocarbon conversion processes, the crystalline aluminosilicate zeolites are the preferred catalyst support materials. They are characterized by their highly ordered crystalline structure and uniformly dimensioned pores and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of molecules which will be rejected (i.e., not adsorbed) by a particular sieve. A number of these zeolite materials are described, for example, in U.S. Patents 3,013,982, 3,013,983, 3,013,984, 3,013,985, and 3,013,986 wherein they are characterized by their composition and X-ray diffraction characteristics. In addition to their extensive use as adsorbents for hydrocarbon separation processes and the like, it has recently been found that crystalline aluminosilicate zeolites, particularly after cation exchange to reduce alkali metal oxide content, are valuable catalytic materials for various processes, particularly hydrocarbon conversion processes.

In general, the chemical formula of anhydrous crystalline aluminosilicate zeolites expressed in terms of moles may be generally represented as:

$$0.9 \pm 0.2 M_{2/n}O : Al_2O_3 : XSiO_2$$

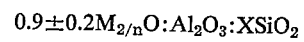

wherein M is a metal cation; $n$ is its valence; and X is a number from about 1.5 to about 12, said value being dependent upon the particular type of zeolite. The zeolite as synthetically produced or as found naturally normally contains an alkali metal, such as sodium or potassium, or an alkaline earth metal, such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g., synthetic faujasite, mordenite, etc., will also have varying silica to alumina ratios depending upon such variables as composition of the crystallization mixture, reaction conditions, etc.

For use in hydrocarbon conversion processes, the higher silica to alumina zeolites will be preferred because of their higher stability at elevated temperature. Therefore, whereas the present invention contemplates the use of zeolites in general, those having silica to alumina mole ratios above about 3 will be especially preferred. Typical among these is the synthetic faujasite variety, wherein X in the above formula is about 3 to 7, preferably 3 to 6, most preferably 4 to 5.5, and the synthetic mordenite variety, wherein X is about 8 to 12, preferably 9.5 to 10.5. It is also within the scope of the present invention to utilize crystalline aluminosilicate zeolites having the crystal structure of a conventional type zeolite, such as faujasite, mordenite, or erionite, as examples, but which have been treated by steam, acid, complexing agents or combinations thereof so as to effectively increase the silica to alumina mole ratio by selective removal of alumina. Thus, faujasite type zeolites having silica to alumina mole ratios as high as 20 or even higher and mordenite type zeolites having silica to alumina mole ratios of 100 or even higher are eminently suitable for use in the practice of the present invention. Zeolites having the crystal structure of erionite which are enhanced in their relative silica content by selective removal of alumina are also preferred catalyst support materials.

When using a crystalline aluminosilicate zeolite as the catalyst support material in the process of the present invention, it is desired to cation exchange the zeolite with the nonnoble metal cation component in such a manner so as to replace 60 to 98%, preferably 70 to 95%, of the alkali (sodium or potassium) ions originally present. The final zeolite catalyst composition should therefore have less than 10 wt. percent of the alkali metal as the oxide and more preferably less than 5 wt. percent of the alkali metal. Additionally, it is desirable that the crystalline aluminosilicate zeolites utilized herein have uniform pore diameters from about 4 to about 15 Angstrom units. These materials may be prepared by methods now well known in the art.

The crystalline aluminosilicate zeolite which has been cation exchanged with the nonnoble metal component above is converted to the mixed nonnoble metal catalyst composition by treating it with either an ammoniacal or alkaline solution of a selective metal from Group V–B or Group VI–B as the oxide or sulfide. It is desirable that from about 3 to 25 wt. percent based on the total catalyst composition of the Group V–B or Group VI–B metal be introduced into the molecular sieve, preferably from about 5 to 15 wt. percent. It is also contemplated to utilize mixtures of Group V–B or Group VI–B metals. For example, the cation exchanged zeolite may be treated with a solution containing the desired form of molybdenum and tungsten or alternatively the zeolite may be treated serially with solutions of each so as to form a cation molybdate-tungstate form of the catalyst.

The preferred crystalline aluminosilicate zeolite molecular sieves include faujasites which have been treated in accordance with the process of the present invention to yield mixed nonnoble metal composites thereon which comprise zinc molybdate, zinc tungstate, nickel tungstate, nickel molybdate, cobalt molybdate, cobalt tungstate and the corresponding cation molybdate-tungstate modifications.

A particularly preferred embodiment involves the treatment of a sodium faujasite catalyst support material with ammonium ion to convert the faujasite to substantially the ammonium form. This ammonium faujasite is then treated with a nonnoble metal cation, preferably nickel, so as to exchange some of the ammonium and/or any residual sodium sites with the nonnoble metal cation. The resulting metal cation exchanged zeolite is then treated with an ammoniacal solution of the Group V–B or Group VI–B nonnoble metal, preferably a tungstate or molybdate, in the anionic form, to yield the mixed nonnoble metal composite. As previously indicated, it is believed that the ammonium ions associated with the Group V–B or Group VI–B metal will effectively back exchange into the cation sites occupied by the nonnoble metal cation. The resulting mixed nonnoble metal composite is distributed extensively and in a highly dispersed form throughout the faujasite base material. The feature of utilizing a catalyst support material which has been initially exchanged with ammonium ions prior to cation exchange with the nonnoble metal cation has been found unexpectedly to yield superior hydrocarbon conversion catalysts.

In still another preferred embodiment of the present invention, crystalline aluminosilicate zeolites having uniform pore openings in the range from about 4 to less than about 6 Angstrom units are utilized as the catalyst support materials. Such small-pore molecular sieve zeolite modifications are useful catalysts in hydroselective reactions, such as selective hydrocracking. Particularly preferred embodiments of small-pore molecular sieves include the hydrogen form of erionite which has been treated in accordance with the present invention to yield a mixed nonnoble metal composite at the exchange sites therein. Particularly preferred embodiments of the small-pore molecular sieves include zinc tungstate zeolite A, zinc molybdate zeolite A, nickel tungstate zeolite A, nickel molybdate zeolite A, zinc tungstate erionite, zinc molybdate erionite, nickel tungstate erionite and nickel molybdate erionite. In each of the foregoing embodiments it should be understood that the zeolite would further include ammonium or hydrogen ions at the cation-exchange sites.

The zeolite A, referred to above, is fully described in U.S. Patent Number 2,882,243 and has a molar formula in the dehydrated form of:

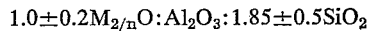

$$1.0\pm0.2M_{2/n}O:Al_2O_3:1.85\pm0.5SiO_2$$

wherein M is a metal cation and $n$ is its valence. The other preferred small-pore form of molecular sieve is the natural or synthetic form of erionite. The naturally-occurring mineral erionite has elliptical pore openings of about 4.7 to 5.2 Angstrom units on its major axis. The synthetic form of erionite can be prepared by known methods, such as those disclosed in U.S. Patent Number 2,950,952. It is characterized by pore openings of approximately 5 Angstrom units and differs from the naturally-occurring form in its potassium content and the absence of extraneous metals.

As an additional embodiment of the present invention, it has been found that the activity and effectiveness of the mixed nonnoble metal containing molecular sieves hereinabove described can be substantially improved by contact with sulfur or sulfur-containing compounds either prior to their use in hydrocarbon conversion processes or by conducting the conversion process in the presence of sulfur or sulfur-containing compounds. The zeolite is preferably sulfactivated by contact either with sulfur-containing feed or, if the feed has a low sulfur content, with hydrogen sulfide or an added sulfur compound which is readily convertible to hydrogen sulfide at the conditions employed, e.g., carbon disulfide and the like. The extent of this sulfactivation treatment should be sufficient to incorporate about 0.5 to 15 wt. percent sulfur into the zeolitic material.

The utilization of catalysts prepared by the process of the present invention is most conveniently evidenced by reference to Table I below.

TABLE I.—MIXED NONNOBLE METAL CATALYSTS IN HYDROCARBON TREATING AND CONVERSION REACTIONS

| Process | Hydrocracking | | Selective Hydrocracking | | Hydroisomerization | |
|---|---|---|---|---|---|---|
| Feedstock | Gas oils | | Naphtha and gas oils | | Light naphtha. | |
| Catalyst | Ni-W-faujasite | | Zn-W-erionite and zeolite A. | | Zn-Mo-mordenite. | |
| Operating Conditions: | Operating | Preferred | Operating | Preferred | Operating | Preferred |
| Temperature, °F | 500–950 | 700–800 | 600–950 | 700–900 | 200–700 | 250–500 |
| Pressure, p.s.i.g | 400–3,000 | 500–1,500 | 400–1,500 | 500–1,000 | 50–500 | 100–300 |
| Space velocity, v./v./hr | 0.2–10 | 0.5–5 | 0.2–5 | 0.5–5 | 0.5–5 | 1–2 |
| $H_2$ Rate, s.c.f./b | 1,000–10,000 | 2,000–5,000 | 1,000–10,000 | 2,000–5,000 | 500–5,000 | 1,000–2,000 |
| Products | Naphtha | | Branched chain and aromatic naphthas and gas oils. | | Branched chain naphthas. | |

| Process | Hydrotreating | | Selective Denitrogenation | | Hydrogenation | |
|---|---|---|---|---|---|---|
| Feedstock | Virgin naphtha, cracked naphtha, and kerosene. | | Distillate oils | | Olefinic naphthas. | |
| Catalyst | Ni-W-faujasite | | Zn-W-faujasite | | Co-Mo-faujasite. | |
| Operating Conditions: | Operating | Preferred | Operating | Preferred | Operating | Preferred |
| Temperature, °F | 200–700 | 300–600 | 200–900 | 400–700 | 100–500 | 200–400 |
| Pressure, p.s.i.g | 50–10,000 | 250–500 | 50–1,500 | 200–800 | 500–3,000 | 1,000–2,000 |
| Space velocity, v./v./hr | 0.5–5 | 1–2 | 0.2–5 | 0.5–2 | 0.5–5 | 1–2 |
| $H_2$ Rate, s.c.f./b | 500–5,000 | 1,000–2,000 | 500–5,000 | 1,000–2,000 | 1,000–10,000 | 2,000–6,000 |
| Products | Prime fuel, motor gasoline and distillates. | | Jet fuel, kerosene, prime fuel distillates. | | Paraffinic and/or naphthenic naphthas. | |

| Process | Disproportionation | | Hydrodealkylation | | Hydroforming | |
|---|---|---|---|---|---|---|
| Feedstock | Alkyl aromatics and alkyl cyclopentanes. | | Alkyl aromatics | | Naphthenic naphthas. | |
| Catalyst | Zn-Mo-mordenite | | Ni-W-erionite | | Ni-W-faujasite. | |
| Operating Conditions: | Operating | Preferred | Operating | Preferred | Operating | Preferred |
| Temperature, °F | 700–950 | 800–900 | 700–1,200 | 800–1,000 | 800–1,000 | 850–950 |
| Pressure, p.s.i.g | 500–2,000 | 700–1,500 | 50–1,500 | 100–1,000 | 50–500 | 100–400 |
| Space velocity, v./v./hr | 0.2–5 | 0.5–2 | 0.2–10 | 0.5–10 | 0.2–10 | 1–5 |
| $H_2$ Rate, s.c.f./b | 500–5,000 | 1,000–2,000 | 500–5,000 | 1,000–2,000 | 1,500–10,000 | 4,000–6,000 |
| Products | Benzene | | Benzene and Toluene | | Aromatic naphtha. | |

The present invention may be more readily understood by reference to the following examples.

Example 1

This example shows the preparation of a mixed nonnoble metal catalyst utilizing the improved process of the present invention. A charge of 100 grams of molybdic acid was dissolved in 1000 grams of concentrated ammonium hydroxide solution at 100° F. and the solution was completed by stirring for 2 hours at 100° F. Thereupon, the solution was evaporated until faintly ammoniacal, reducing the weight to 523 grams. To this concentrate, 1000 grams of water were added and, while stirring at room temperature, 500 grams of zinc faujasite prepared by zinc ion exchange of sodium faujasite were added in small increments. The suspension was stirred for 24 hours at room temperature and then was filtered, dried, and pelleted for use. Of the original 500 grams zinc faujasite, 593 grams of dried material were recovered, which demonstrates a remarkable uptake of the molybdenum material. The final catalyst composition contained 9.9 wt. percent zinc and 12.7 wt. percent molybdenum trioxide. The faujasite used in this example had a silica to alumina mole ratio of 4.8/1. X-ray analysis of the product revealed that the catalyst, prior to calcination and/or sulfactivation, consisted in part of zinc molybdate hydrate. After heat treatment and sulfactivation the particles of zinc molybdate were too small to be detected by the X-ray technique. This small state of division and dispersion is highly desirable for hydrocarbon conversion reactions.

Example 2

This example confirms the cation ion-molybdate anion reaction in Example 1. Furthermore, this example demonstrates that the uptake of the molybdenum component of Example 1 is not by an impregnation mechanism. For these demonstrations 500 grams of sodium faujasite was first converted to ammonium faujasite in a threefold exchange with ammonium chloride solution. Each exchange involved suspension in 1000 cc. of water and, while agitating with a mechanical stirrer, addition of a solution of one pound of ammonium chloride in 1500 grams of water. Agitation was continued for 4 hours at room temperature. In each exchange operation the treating solution was removed by filtration and one water wash was employed after the first and second exchanges and 3 water washes after the third exchange. Each water wash consisted of supension with agitation of the filter cake from the previous filtration in 2000 cc. of water for a period of one hour at ambient temperature. The threefold exchanged and washed product was air dried on the filter for subsequent use.

A solution of ammonium molybdate was prepared from 100 grams of molybdic acid as in Example 1. Following solution in 1000 grams of concentrated ammonium hydroxide, evaporation to about 500 grams and addition of water to bring the solution weight to about 1500 grams, the filter cake of the ammonium faujasite was added in small increments and the suspension was stirred for 24 hours at ambient temperature. Thereupon, the treating solution was removed by filtration and the filter cake was dried without further washing. Of the 500 grams of the starting sodium faujasite only 385 grams of the molybdena-ammonium-hydrogen faujasite were recovered which indicates very little molybdena uptake. This is confirmed by analytical data on the dried product which are:

| | |
|---|---|
| Sodium, wt. percent | 2.1 |
| $SiO_2$, wt. percent | 67.4 |
| $Al_2O_3$, wt. percent | 23.3 |
| $MoO_3$, wt. percent | 1.9 |

Thus, at the concentrations employed very little of the Group VI material is incorporated in the zeolite catalyst unless a receptive cation is present.

Example 3

This example demonstrates the hydrocracking activity of the catalyst composition prepared by the method of Example 1. The catalyst prepared in Example 1 was used with light catalytic cycle oil, first at 650° F. without sulfur activation and then at 700° F. with sulfur activation. The hydrocracking without added sulfur was not extensive but at 700° F. with sulfur activation was essentially 100% to 430° F.— products. Accordingly, the temperature was reduced to 650° F. and operation was continued with 0.25 wt. percent carbon disulfide in the feed. Under these conditions about 60% of the feed was hydrocracked to 430° F.— products, which is comparable to the extent of hydrocracking obtained with the palladium-hydrogen faujasite in another operation. Also, it was observed that at approximately the same degree of cracking the octane value of naphtha products from the nonnoble metal catalyst were equal to or were somewhat higher than obtained with the palladium catalyst prepared for commercial use. Comparative data at about the same yield level are indicated in Table II below:

TABLE II.—HYDROCRACKING OF CATALYTIC CYCLE STOCK

| | Catalyst | |
|---|---|---|
| | 0.5% Palladium-Hydrogen Faujasite | Zinc Molybdate Faujasite of Example 1 |
| Operating Conditions: | | |
| Temperature, °F | 612 | 650 |
| Feed rate, v./v./hr | 2.4 | 1 |
| Pressure, p.s.i.g | 1,500 | 1,000 |
| Yield on Feed: | | |
| C₃ and lighter, wt. percent | 3.3 | 2.8 |
| i-C₄, vol. percent | 10.3+ | 6.6 |
| n-C₄, vol. percent | 5.7 | 3.2 |
| C₅-430° F., vol. percent | 55.3 | 58.1 |
| 430° F.+, vol. percent | 40.9 | 39.6 |
| Inspections on C₅-430° F. Naphtha: | | |
| RON +3 cc. TEL | 92 | 95.2 |
| MON +3 cc. TEL | 88 | 90.7 |

It is thus apparent that any inherent lower activity of the nonnoble metal catalyst can be compensated by adjustment of the operating conditions without impairment to the quality of the naphtha product.

Example 4

This example shows the improved hydrocracking activity obtainable with a zinc molybdate catalyst prepared in accordance with Example 1 on other feed stocks.

The catalyst of Example 1 was employed in the fixed-bed, downflow hydrocracking of a heavy virgin naphtha at 650° F., 1 v./v./hr. and 1000 p.s.i.g. Its performance is compared below in Table III with hydroselective cracking catalyst containing palladium supported on Zeolite A.

TABLE III

| | Feed | Catalyst | |
|---|---|---|---|
| | | Zinc Molybdate Faujasite | 0.5% Palladium-Zinc Zeolite A [1] |
| Operating Conditions: | | | |
| Feed rate, v./v./hr | | 1 | 1 |
| Pressure, p.s.i.g | | 1,000 | 1,000 |
| Temperature, °F | | 650 | 850 |
| Yields on Feed: | | | |
| C₃ and lighter, wt. percent | | 4.6 | 8.8 |
| i-C₄, vol. percent | | 13.7 | 1.4 |
| n-C₄, vol. percent | | 4.0 | 5.4 |
| C₅+, vol. percent | 100 | 88.4 | 87.7 |
| C₅+ Inspections: | | | |
| RON +3 cc. TEL | 60.7 | 82.8 | 79.9 |
| MON +3 cc. TEL | 64.0 | 83.0 | 75.2 |
| Gravity, °API | 47.2 | 61.2 | 50.8 |
| ASTM Dist., °F.: | | | |
| IBP | 330 | 94 | 100 |
| 5% | 332 | 120 | 130 |
| 10% | 336 | 140 | 205 |
| 20% | 340 | 178 | 287 |
| 50% | 356 | 272 | 340 |
| 80% | 387 | 336 | 366 |
| 90% | 400 | 361 | 382 |
| 95% | 423 | 390 | 440 |
| FBP | 440 | 408 | 454 |

[1] The zinc content of this catalyst was 21.0 wt. percent.

The superiority of the zinc molybdate faujasite is apparent from the standpoint of (1) yield, (2) octane number data, (3) production of lower boiling naphthas and (4) the more favorable isobutane yield. The latter while not included in the yield of C₅+ is of considerable advantage as alkylation feed stock.

Example 5

This example indicates the improved activity and selectivity obtainable with a zinc molybdate faujasite catalyst prepared in accordance with Example 1 on still another petroleum hydrocarbon feed stock.

The catalyst of Example 1 is compared with a commercial 0.5 wt. percent palladium on hydrogen faujasite catalyst when processing heavy cracked naphtha feed. Data are summarized in Table IV.

TABLE IV

| | | Catalyst | |
|---|---|---|---|
| | Feed | Zinc Molybdate Faujasite | Palladium-Hydrogen Faujasite |
| Operating Conditions: | | | |
| Feed rate, v./v./hr | | 1 | 1 |
| Pressure, p.s.i.g | | 1,000 | 500 | 1,500 |
| Temperature, °F | | 680 | 560 | 700 |
| Yields on Feed: | | | |
| C₃ and Lighter, wt. percent | | 3.0 | 1.7 | 11.0 |
| C₄, vol. percent | | [1] 10.1 | 7.3 | 38.0 |
| C₅-43° F., vol. percent | 92.4 | 97.3 | 94.4 | 76.0 |
| 430° F.+, vol. percent | 7.6 | 3.8 | 4.6 | 0 |
| C₅-430° F. Inspections: | | | | |
| RON +3 cc. TEL | 87.2 | 90.0 | 88 | 94.4 |
| MON +3 cc. TEL | 77.8 | 89.2 | 80.6 | 92.6 |
| Sulfur, p.p.m | 1,150 | <20 | | |
| Bromine No | 27 | <1 | | |
| Vol. percent aromatics | 43 | 45 | 30 | 13 |
| MSA-OD | 0.89 | 0.05 | | |

[1] 6.5/3.6 ratio, i-C₄/n-C₄.

From the standpoint of yield and octane number improvement the zinc molybdate faujasite is superior to the commercial palladium hydrogen faujasite catalyst. The degree of desulfurization and olefin saturation are added credits. The improvement in octane number with olefin saturation is an unexpected performance. Another noteworthy performance is the saturation of olefins without hydrogenation and cracking of aromatic constituents so that the latter goes through the process essentially unchanged. The MSA-OD test is a measure of the gum forming tendencies of a naphtha as determined by optical density measurement of a treated sample. The lower the value, the more stable is the naphtha. A typical regular grade gasoline blend should not exceed a level of 0.2 MSA-OD.

Example 6

The catalyst of Example 1 was further tested with light catalytic naphtha in a study of improvement of motor octane number. Yield and performance data are given below in Table V.

TABLE V.—MOTOR OCTANE NUMBER IMPROVEMENT OF LIGHT CATALYTIC NAPHTHA BY MILD HYDROCRACKING WITH ZINC MOLYBDATE FAUJASITE CATALYST

| Operating Conditions: | |
|---|---|
| Feed rate, v./v./hr | 1 |
| Pressure, p.s.i.g | 1,000 |
| Temperature, °F | 670 |
| Gas Rate, c.f.H₂/bbl | 2,000 |

| | Feed | |
|---|---|---|
| Yields on Feed: | | |
| C₃ and Lighter, wt. percent | Trace | 3.0 |
| i-C₄, vol. percent | 0.4 | 7.1 |
| n-C₄, vol. percent | 0.9 | 3.8 |
| C₅+, vol. percent | 98.7 | 90.5 |
| MON +3 cc. TEL | 86.0 | 92.9 |
| MSA-OD | 0.85 | 0.02 |

The 6.9 MON is a notable improvement and the yield loss is offset to a major extent with the 7.1 vol. percent yield of isobutane. Other assets are the motor cleanliness features reflected by the lower bromine number and the MSA-OD value. Since a major portion of the gasoline pool consists of catalytic naphtha, the outstanding reduction in MSA-OD obtained simultaneously with other improvements provides for greater flexibility in preparation of gasoline blends.

Example 7

This example demonstrates the critical nature of utilizing the catalyst preparation steps of the present invention to prepare mixed nonnoble metal catalysts as compared with methods of preparing similar catalysts utilized in the art. A nickel tungstate catalyst prepared according to the techniques of Example 1 is shown to be superior to similar compositions but prepared by impregnation techniques. For this work a nickel faujasite prepared by the nickel exchange of ammonium faujasite was reacted with an ammonium tungstate solution. The exchange of the ammonium faujasite with nickel was employed because nickel does not exchange as readily and as completely with the sodium form as other cations, e.g. zinc and ammonium ions. An alternate to the double ion exchange, i.e., the ammonium ion and the nickel ion is the exchange with ammoniacal nickel salt solutions to reduce the sodium ion to an acceptable level. In the preparation of the superior nickel tungstate catalyst, a charge of 500 grams of sodium faujasite was first converted to the ammonium ion modification by suspension in 1000 cc. of water and, while agitating at room temperature, a solution of one pound of ammonium chloride in 1500 cc. of water was added and agitation was continued for four hours. The treating solution was removed by filtration and the wet cake was water washed upon transfer to 2000 cc. of water and agitation for one hour. Using the wet cake from filtration following the wash after the first exchange a second and then a third exchange was made with fresh ammonium chloride solutions as in the first instance, except that three water washes were employed after the third exchange. The three-fold ammonium ion exchanged and washed faujasite was air dried on the filter for subsequent exchange with nickel ion.

This ammonium faujasite was suspended in 1000 cc. of water and a solution of one pound of nickelous chloride in 1500 cc. of water was added, while agitating thoroughly with a mechanical stirrer, and agitation was continued for four hours at room temperature. As in the ammonium ion exchange, three such exchanges were made with fresh nickelous chloride as in the first instance with one water wash each after the first and second exchanges and three water washes after the third exchange. These washes consisted of suspension of the wet cake from the previous filtration in 2000 cc. of water and agitation for one hour at room temperature followed by filtration to remove the treating solution and/or wash water. The three-fold and washed nickel faujasite was reacted with ammonium tungstate solution as follows:

A charge of 100 grams of tungstic acid was treated with 1000 grams of concentrated ammonium hydroxide for two hours at 150° F. Thereupon, excess ammonia was removed by evaporation at about 200° F. until about 500 cc. remained. The solution was diluted to 3000 cc. which was sufficient to maintain complete solution at 150° F. This ammonium tungstate solution at 150° F. was transferred to a 5 liter flask equipped with a sealed stirrer and the nickel faujasite, described above, was added in small increments while stirring. Agitation was continued for 24 hours at about 150° F. using a reflux condenser to prevent evaporation losses. Thereupon, the treating liquid was removed by filtration and the filter cake was dried overnight in a vacuum oven at 150° F. This catalyst possessed about 87% of the faujasite crystallinity as evaluated by X-ray determination and by chemical methods analyzed as follows:

| | |
|---|---|
| Ni, wt. percent | 5.8 |
| W, wt. percent | 9.9 |
| Sodium, wt. percent | 1.95 |

Since at atomic ratio of nickel to tungsten is 1.8 it is concluded that the catlyst consists of hydrogen-nickel faujasite together with an intimate dispersion of nickel tungstate at or near the exchange sites. This catalyst is designated by the letter A in the discussion that follows.

In order to establish a comparison with a catalyst prepared by impregnation techniques, catalyst B was prepared by impregnating 145 grams of a moist cake of ammonium faujasite with a solution containing 29.7 grams nickelous nitrate $(Ni(NO_3)_2 \cdot 6H_2O)$ in 25 cc. of water. Thereupon, a solution of 14.7 grams of ammonium meta-tungstate in 25 cc. of water was added and the resulting paste was heated on a hot plate until the gummy characteristic was removed and then the catalyst cake was dried overnight at 212° F. in a vacuum oven. The catalyst analyzed 5.9% nickel and 12.3 wt. percent $WO_3$ and by X-ray analysis retained 86.0% of the faujasite crystallinity.

These two catalysts, A by exchange technique involving relatively dilute solution and low ratio of zeolite to weight of solution, and B by impregnation technique involving more concentrated solutions and a much higher ratio of zeolite to solution, were tested identically for hydrocracking a light catalytic cycle oil fortified with nitrogen compound to a nitrogen content of 1000 p.p.m. The catalysts were first sulf-activated in a 4 hour period at atmospheric pressure and a temperature of 400–600° F. using 49–51 liters of a 90–10 hydrogen-hydrogen sulfide mixture. Following this activation both catalysts were employed in hydrocracking operation at 580–630° F. during a 24-hour period and then were tested at 755° F. Results of these tests are summarized in Table VI.

TABLE VI.—COMPARISON OF CATALYSTS IN HYDROCRACKING LIGHT CATALYTIC CYCLE OIL OF 1,000 p.p.m. NITROGEN CONTENT AND 3,000 p.p.m. SULFUR CONTENT CATALYSTS-SULFACTED PRIOR TO USE

[Temperature, 755° F. Feed Rate, 1.0 v./v./hr. Catalyst Volume, 10 cc.]

| Catalyst age: | | | | | | | | | | | | | | |
|---|---|---|---|---|---|---|---|---|---|---|---|---|---|---|
| Hours with feed | 41.5 | | 47.5 | | 65.5 | | 68.5 | | 71.5 | | 89.5 | | 92.5 | |
| Hours at 755° F | 17.5 | | 23.5 | | 41.5 | | 44.5 | | 47.5 | | 65.5 | | 68.5 | |
| Catalyst designation | A | B | A | B | A | B | A | B | A | B | A | B | A | B |
| Pressure, p.s.i.g | 600 | 600 | 600 | 600 | 1,000 | 1,000 | 1,000 | 1,000 | 1,000 | 1,000 | 1,000 | 1,000 | 1,000 | 1,000 |
| Wt. percent conversion | 82 | 74 | 82 | 77 | 82 | 73 | 84 | 73 | 83 | 70 | 82 | 67 | 84 | 67 |

The superiority of the catalyst (A) prepared by the exchange techniques is obvious. It provides for appreciably better conversion at the conditions of the test and no detectable loss in activity was observed during the period of test. On the other hand, the lower activity catalyst (B) prepared by impregnation did show loss in activity. This is shown graphically in the figure.

Example 8

This example shows the more complete removal of sodium by first exchanging with ammonium ion as in Example 7 as contrasted to direct exchange with nickel salt solution. Samples of sodium faujasite and ammonium faujasite prepared by ammonium ion exchange of sodium faujasite were treated with nickelous chloride solution as in Example 7, except that the first two exchanges were for two hours each and the third exchange was for 24 hours. Analytical data are

| Sample | Sodium Faujasite | Ammonium Faujasite |
|---|---|---|
| Weight percent sodium prior to Ni exchange | 10.4 | 1.6 |
| Weight percent sodium after Ni exchange | 3.9 | 1.5 |
| Weight percent nickel after Ni exchange | 8.0 | 8.2 |

Thus after the exhaustive exchange (last operation for 24 hours) the sodium content is higher than desired in direct exchange of nickel for sodium, whereas appreciably lower sodium levels result upon exchanging the ammonium faujasite.

Example 9

This example demonstrates the improved hydrocracking activity and selectivity obtained by utilizing a nickel-tungstate faujasite catalyst prepared by the method of Example 7.

Previously the nickel-tungstate faujasite prepared by exchange techniques was shown to have good activity in the presence of appreciable nitrogen and sulfur contaminants. These contaminant resistant properties are demonstrated in flow units with 200 cc. of catalyst and a light catalytic cycle oil. The outstanding catalyst performance at high feed rates is illustrated by comparison with the commercial palladium hydrogen faujasite catalyst. The data are summarized in Table VII.

TABLE VII

| | Feed | Catalyst | |
|---|---|---|---|
| | | Nickel-Tungstate Faujasite by Exchange Methods | Commercial Pd-Hydrogen Faujasite |
| Temperature, °F | | 740 | 710 |
| Pressure, p.s.i.g | | 1,000 | 1,500 |
| Feed rate, v./v./hr | | 5 | 3 |
| Product Distribution: | | | |
| $C_3$ and L, wt. percent | | 8.2 | 3.5 |
| $C_4$, vol. percent | | 17.5 | 12.0 |
| $C_5$–430° F. fraction, vol. percent | <5 | 48.1 | 58.5 |
| 430° F.+, vol. percent | >95 | 40.7 | 42.5 |
| Naphtha ($C_5$–430° F.) Octane Data: | | | |
| Research +3 cc. TEL | | 99.9 | 96.6 |
| Motor +3 cc. TEL | | 91.0 | 91.0 |

The extent of cracking and the higher octane number of the product naphtha all at the high feed rate of 5 v./v./hr. attest the outstanding features of the nonnoble metal composition.

Example 10

In Examples 7 and 9 the nonnoble catalysts containing metal Group VIII and Group VI elements have been demonstrated to be effective with nitrogen containing feeds and is thus a catalyst not readily poisoned with nitrogen either in the feed or in the hydrocracked products. This desirable property is utilized in the present example under mild conditions to bring about nitrogen removal without excessive cracking to naphtha products. This feature of nitrogen removal without excessive cracking is illustrated with operations using a sulf-activated zinc tungstate faujasite as one operable example of catalysts prepared by the process of the present invention and raw, light catalytic cycle oil as feed at 1 v./v./hr. Upon reducing the pressure, a relatively mild condition is achieved as the following data in Table VIII indicate.

TABLE VIII.—NITROGEN REMOVAL FROM LIGHT CATALYTIC CYCLE OIL IN HYDRO OPERATIONS WITH 4,000 c.f./b. $H_2$ RATE

| Operation | Feed | Mild | Severe |
|---|---|---|---|
| Temperature, °F | | 700 | 690 |
| Pressure, p.s.i.g | | 275 | 1,000 |
| Product Distribution: | | | |
| $C_3$–wt. percent | | 1.1 | 4.5 |
| $C_4$, vol. percent | | 2.1 | 15.7 |
| $C_5$–430° F., vol. percent | <5 | 10.9 | 54.0 |
| 430° F., vol. percent | >95 | 88.1 | 41.4 |
| 430° F.+Inspections: | | | |
| Gravity, °API | 29.4 | 30.9 | 39.9 |
| Sulfur, p.p.m | 4,050 | 3,140 | 400 |
| Nitrogen, p.p.m | 32 | 1 | 7 |

Of special significance is the nitrogen removal in the mild operation without a comparable sulfur removal. This is accomplished only by preferential reaction of the nitrogen-containing compounds when the zinc tungstate faujasite catalyst is employed.

The nitrogen-removal by mild treatment with zinc tungstate faujasite has been extended to the improvement of the color stability of West Coast kerosene. Efforts to improve color and color stability with conventional hydrofining catalysts and techniques have not been satisfactory.

TABLE IX.—TREATING WEST COAST KEROSENE FOR IMPROVED COLOR STABILITY

| | Feed | Catalyst | | |
|---|---|---|---|---|
| | | Sulf-Activated Zinc-Tungstate Faujasite | Commercial Cobalt Molybdate Alumina | |
| Process Conditions: | | | | |
| Temperature, °F | | 685 | 650 | 650 | 650 |
| Pressure, p.s.i.g | | 275 | 400 | | 700 |
| Feed rate, v./v./hr | | 1 | 1 | | 1 |
| $H_2$ rate, s.c.f./b | | 2,000 | 400 | 400 | 400 |
| Liquid Product Inspections: | | | | |
| Gravity, °API | 39.7 | 45.2 | | | |
| Color | 10¼ TR | 24 S | 25 TR | | 25 TR |
| Color stability [1] | 10 TR | 21 S | 19 TR | | 19 TR |
| Sulfur, p.p.m | 2,530 | 3,200 | | | |
| $N_2$, p.p.m | 223 | <5 | | | |

[1] Color after saturating with air and heating for 16 hours.

The superiority of the zinc tungstate faujasite catalyst is shown by the data compiled in Table IX In both the Tag Robinson (TR) and Saybolt (S) color scales employed above the higher numerical values denote better color and the Saybolt scale is employed for materials of extremely good color characteristics. However, the scales do overlap and to assist in evaluating the outstanding performance of the zinc tungsten-faujasite catalyst the overlapping region is tabulated below:

| Scale | Tag Robinson | Saybolt |
|---|---|---|
| Color Gradation: | | |
| Water White | | +30 |
| Pale Yellow | 25 | −2 |
| Darker Yellow | 21 | −16 |
| Dark Red | 4 | |

It is observed that the catalyst of this invention produced an almost water-white kerosene which possessed remarkable color stability. This was accomplished with almost complete removal of the nitrogen compounds but with no removal of the sulfur. The commercial hydrofining catalyst removed sulfur and did not effect the color improvement brought about with the superior zinc-tungsten-faujasite composition. Again the remarkable denitrogenation feature without sulfur removal is emphasized as a unique and different catalyst performance.

Example 11

This example shows the improved activity and selectivity obtainable in a hydrocracking process when utilizing a cobalt molybdate faujasite catalyst as prepared by the method of Example 7.

An ammonium faujasite exchanged in a manner identical with that of Example 7 was further exchanged with cobaltous chloride in an analogous manner. That is the filter cake from the three-fold ammonium ion exchanged and washed faujasite was suspended in 1000 cc. of water, and while stirring at room temperature, a solution of one pound of cobaltous chloride in 1500 cc. of water was added. Agitation was continued for four hours at room temperature whereupon the treating liquid was removed by filtration and the filter cake was water washed as in Example 7. Two subsequent exchanges were made with the filter cake from the washing using fresh cobaltous chloride in each case. Three water washes were employed after the third exchange. The filter cake from the third wash was treated with ammonium molybdate solution prepared as follows:

A charge of 100 grams of molybdic acid was dissolved in 1000 grams of ammonium hydroxide at about 150° F. and the solution was evaporated to expel excess ammonia at about 200° F., while stirring with a magnetic bar, until the volume of solution was about 500 cc. To this solution 1000 grams of water was added and the cobalt faujasite cake was added in small increments to the resulting solution of ammonium molybdate. The suspension was agitated for 24 hours at room temperature, whereupon the treating solution was removed by filtration. The wet cake was air dried on the filter and then overnight in a vacuum oven at 150° F. The product analyzed 1.78 weight percent sodium, 6.3 weight percent cobalt and 13.1 wt. percent molybdena ($MoO_3$).

This catalyst was tested in a 200 cc. flow unit, starting with sulf-activation and then feeding raw light catalytic cycle stock. The data in comparison with those obtained from the commercial palladium hydrogen faujasite catalyst are summarized in Table X.

TABLE X.—COBALT-MOLYBDATE FAUJASITE VS. PALLADIUM HYDROGEN FAUJASITE AS HYDROCRACKING CATALYST

| Catalyst | Cobalt Molybdate Faujasite | | | Palladium Hydrogen Faujasite |
|---|---|---|---|---|
| Process Conditions: | | | | |
| Temperature, °F | 712 | 712 | 721 | 710 |
| Pressure, p.s.i.g | 1,000 | 600 | 1,000 | 1,500 |
| Feed rate, v./v./hr | 1 | 2 | 6 | 3 |
| Product Distribution: | | | | |
| $C_3$ and lighter, wt. percent | 7.1 | 3.7 | 2.6 | 3.5 |
| $C_4$, vol. percent | 25.1 | 10.7 | 7.3 | 12.0 |
| $C_5$–430° F. Naphtha, vol. percent | 82.2 | 56.4 | 41.0 | 58.5 |
| 430° F.+, vol. percent | 8.3 | 41.4 | 57.7 | 42.5 |
| Naphtha Octane Data: | | | | |
| Research +3 cc. TEL | 98.1 | 98.5 | 97.8 | 96.6 |
| Motor +3 cc. TEL | 91.9 | 90.3 | 89.9 | 91.0 |

At comparable conditions of temperature and feed rate, the cobalt molybdate composition proves to be an effective hydrocracking catalyst and yields a naphtha product of some 1–2 leaded research octane number increase as compared to the commercial noble metal hydrocracking catalyst. Furthermore, the non-noble metal catalyst is demonstrated to provide effective hydrocracking at high feed rates. This feature was observed in Example 9 with the nickel tungsten faujasite but at somewhat higher operating temperature.

Example 12

This example demonstrates the preparation of a small-pore molecular sieve catalyst, i.e., a catalyst having uniform pores in the range from about 4 to about 6 Angstrom units, which catalysts are of particular interest in hydroselective conversion processes.

A zinc-tungstate molecular sieve catalyst was prepared by first ion exchanging the sodium form of zeolite A to form the zinc modification. The ion exchange was accomplished in three successive exchanges, each comprised contacting 500 grams of zeolite A with 2500 milliliters of a 15% solution of zinc chloride. The resulting three-fold zinc exchanged zeolite A by this technique has been found to have 21 wt. percent of zinc incorporated therein.

This zinc zeolite A was composited with tungsten as per the following process. Ammonium tungstate was prepared by the addition of 100 grams of tungstic acid ($WO_3$) to 1000 grams of concentrated ammonium hydroxide while stirring with a magnetic stirrer at 100° F. This did not effect solution of the ammonium tungstate. The solution was evaporated by boiling until faintly ammoniacal. Thereupon, water was added in 500 gram increments to bring the total weight of water plus salt to about 3000 grams. This resulted in complete solution at 150° F. To this solution at 150° F., the wet cake containing about 500 grams of the zinc zeolite A was added in small increments with good stirring at 150° F. and, upon removal of heat, agitation was continued for 24 hours. The treating liquor was removed by filtration and the cake was dried with no intervening water washes. The product analyzed 11.8 wt. percent tungsten.

The catalyst, after drying, was pelleted and was calcined for 3.5 hours at 950 to 1000° F. after first heating carefully to 300° F. and thereafter increasing the temperature at the rate of 100° F./hour in the 300 to 1000° F. range. The calcined catalyst was cooled and stored in a sealed bottle prior to use.

Example 13

This example shows the utility of a zinc-tungstate zeolite A catalyst prepared by the process of the present invention in hydroselective cracking of a naphtha feed stock.

The catalyst prepared in Example 12 was sulfactivated by operation with carbon disulfide in the feed and was used with Arabian $C_5$–$C_6$ feed under essentially the same conditions as employed with a sulfactivated palladium zinc zeolite A. Comparative data at both 850° F. and 750° F. showed that zinc tungstate catalyst to have about the same activity for conversion of normal paraffins and to produce the same amount of isoparaffins in the product at a given degree of conversion as exhibited by the palladium-zinc zeolite A catalyst. Data showing these features are contained in Table XI.

TABLE XI.—HYDROSELECTIVE CRACKING OF ARABIAN $C_5$–$C_6$ NAPHTHA

[0.5 v./v./hr., Ca. 2,000 c.f./b. $H_2$ rate, 0.25 wt. percent $CS_2$ in feed]

| | Feed | Catalyst | | | |
|---|---|---|---|---|---|
| | | Zinc Tungstate–Zeolite A | | Zinc Pd–Zeolite A | |
| Temperature, °F | | 750 | 850 | 750 | 850 |
| Pressure, p.s.i.g | | 500 | 500 | 1,000 | 500 |
| Product Distribution, wt. percent: | | | | | |
| $C_3^-$ | 0.0 | 18.5 | 36.2 | 19.1 | 42.2 |
| $i$-$C_4$ | 0.0 | 0.8 | 1.8 | 0.9 | 2.2 |
| $n$-$C_4$ | 1.8 | 10.8 | 10.9 | 10.2 | 11.4 |
| $i$-$C_5$ | 14.1 | 12.7 | 11.3 | 14.3 | 11.5 |
| $n$-$C_5$ | 24.2 | 14.0 | 8.4 | 14.9 | 6.6 |
| 2,2 DMB | 0.6 | 0.3 | 0.3 | 0.3 | 0.3 |
| 2,3 DMB, 2 MP | 17.4 | 16.7 | 12.8 | 15.4 | 10.2 |
| CP, 3 MP | 12.9 | 12.4 | 10.6 | 12.0 | 9.6 |
| $NC_6$ | 22.9 | 8.8 | 3.5 | 8.1 | 1.3 |
| MCP | 3.3 | 3.0 | 2.6 | 2.9 | 2.6 |
| 3 MH CH } | 0.5 | 0.5 | 0.4 | 0.4 | 0.4 |
| Benzene | 1.9 | 1.5 | 1.2 | 1.5 | 1.7 |
| Other | 0.4 | | | | |
| Conversion, $n$-$C_6$ | | 62 | 85 | 65 | 74 |
| Percent 2,3 DMB-2 MP Unreacted | | 96 | 74 | 88 | 59 |
| Percent CP-3 MP Unreacted | | 96 | 82 | 93 | 75 |

The above data can be evaluated by examination of the conversion of normal paraffins and the amount of branched paraffin remaining unreacted. Under the conditions requiring large conversion because of the high amount of normal paraffins in the feed, the zinc tungstate catalyst compares very favorably with the more expensive noble metal catalyst and if anything is even more selective. Thus, it could be used with feeds of lower normal paraffin content or at least severe conditions with the high n- paraffinic feeds and recycle of the C₅+ portion with improved results.

Example 14

This example demonstrates the preparation and catalytic use of a zinc molybdate mordenite type catalyst.

A charge of 100 grams of molybdic acid was dissolved in 1000 grams of concentrated ammonium hydroxide solution at 100° F. and the solution was completed by stirring for 2 hours at 100° F. Thereupon, the solution was evaporated until faintly ammoniacal, reducing the weight to 523 grams. To this concentrate, 1000 grams of water were added and, while stirring at room temperature, 500 grams of zinc mordenite, prepared by zinc ion exchange of sodium mordenite, were added in small increments. The suspension was stirred for 24 hours at room temperature and then was filtered, dried and pelleted for use. The final catalyst composition contained 4.3 wt. percent zinc and 6.4 wt. percent molybdenum trioxide.

The zinc molybdate mordenite catalyst was then tested for catalytic activity utilizing methylcyclopentane (99.5+% pure) as the feed stock. In order to obtain an active form of the catalyst, it was sulfided by exposure at elevated temperatures to a C₅/C₆ feed containing from 0.25 to 1% CS₂. The catalyst can also be sulfactivated by including a sulfur-containing compound in the methylcyclopentane feed stream for the desired period of time until the catalyst has become sulfided.

The test was run at a temperature of 850° F., a space velocity of 0.55 v./v./hr., a hydrogen flow rate of 2220 c.f./b. and a pressure of 500 p.s.i.g. The resulting product was analyzed by gas chromatography which indicated that there was a 47% conversion of the methylcyclopentane feed stream. Product analysis of the converted material gives the following distribution (percentages are given based on the total product stream including the unconverted portion) as summarized in Table XII.

TABLE XII

| Product: | Quantity, percent |
|---|---|
| Aromatics | 10.3 |
| Benzene | 0.7 |
| Toluene | 2.1 |
| Ethylbenzene | 0.6 |
| M and P xylenes | 2.5 |
| O xylene | 0.8 |
| Methyl ethylbenzenes | 1.7 |
| Trimethylbenzene | 1.9 |
| Cyclohexanes | 4.9 |
| Cyclohexane | 4.2 |
| Methylcyclohexanes | 0.7 |
| Paraffins | 26.7 |
| C₃⁻ | 8.2 |
| i-C₄ | 4.1 |
| n-C₄ | 1.1 |
| i-C₅ | 5.0 |
| n-C₅ | 1.3 |
| 2,2-dimethylbutane | 0.2 |
| 2-methylpentane | 3.3 |
| 3-methylpentane | 2.5 |
| n-C₆ | 1.0 |
| Polymethylcyclopentanes | 5.1 |

The hydroisomerization activity of the zinc molybdate mordenite is shown by the production of a substantial amount of paraffin and further by the production of the C₆ cyclic compounds hydroalkylation and disproportionation activity of the catalyst is evidence by the aromatics, polymethyl aromatics and polymethylcycloparaffins produced by the reaction.

While the activity of the zinc molybdate mordenite catalyst has been shown for a methylcyclopentane feed, such activity is exhibited as well when other feed stocks are utilized. For example, a toluene-containing feed contacted with the zinc-molybdate mordenite catalyst of this example at the same general conversion conditions is disproportioned at high conversion levels to benzene and xylene.

What is claimed is:

1. An improved process for the preparation of mixed nonnoble metal catalysts which contain a crystalline alumino-silicate zeolite having uniform pore diameters from about 4 to about 15 Angstrom units, said process comprising, in combination:
   (a) ion exchanging said catalyst with a cation selected from the nonnoble metal cations of Group VIII of the Periodic Table; and
   (b) treating said ion exchanged catalyst with a metal compound selected from metal compounds of Group VI–B of the Periodic Table whereby a mixed nonnoble metal composite is formed at or near the ion-exchange sites of said zeolite catalyst.

2. The process of claim 1 wherein said crystalline aluminosilicate zeolite is a faujasite having a silica to alumina mol ratio greater than 3.

3. The process of claim 1 wherein said first nonnoble metal is nickel and said second nonnoble metal is a compound of tungsten.

4. The process of claim 1 wherein said first nonnoble metal is nickel and said second nonnoble metal is a compound of molybdenum.

5. The process of claim 1 wherein said first nonnoble metal is cobalt and said second nonnoble metal is a compound of tungsten.

6. The process of claim 1 wherein said first nonnoble metal is cobalt and said second nonnoble metal is a compound of molybdenum.

7. The process of claim 1 wherein said faujasite is substantially in the ammonium exchanged form prior to exchange with the said first nonnoble metal cation.

8. The process of claim 1 wherein said crystalline aluminosilicate zeolite is erionite.

9. The process of claim 1 wherein said crystalline aluminosilicate zeolite is mordenite.

10. A catalyst composition comprising a mixed nonnoble metal component on a crystalline aluminosilicate zeolite having uniform pore diameters from about 4 to 15 Angstrom units, said catalyst composition being prepared by ion exchanging said catalyst support with a cation selected from the nonnoble metal cations of Group VIII of the Periodic Table and then treating said ion exchanged catalyst with a second nonnoble metal in anionic form, said second nonnoble metal being selected from the compounds of metals in Group VI–B of the Periodic Table.

11. The composition of claim 10 wherein said first nonnoble metal ion is nickel and said second nonnoble metal is a compound of tungsten.

12. The composition of claim 10 wherein said catalyst support comprises the hydrogen form of a faujasite having a silica to alumina mol ratio greater than 3.

13. An improved hydrocracking process comprising contacting a petroleum feed stock at a temperature in the range of from 500–950° F., a pressure in the range of from 400–3000 p.s.i.g., a space velocity in the range of 0.2–10 v./v./hr. and hydrogen recycle rate of 1,000–10,000 s.c.f./b. with a catalyst composition comprising a mixed nonnoble metal component composited with a crystalline aluminosilicate zeolite having uniform pore diameters in the range of about 4 to about 15 Angstrom units, said catalyst composition being prepared by cation exchanging said crystalline aluminosilicate zeolite with a first nonnoble metal in the cationic form which first nonnoble metal is selected from the metal cations of the nonnoble metal constituents of Group VIII of the Periodic Table and then treating said cation exchanged zeolite with a second nonnoble metal which second nonnoble metal is selected from the group consisting of the oxides and sulfides of Group VI–B of the Periodic Table whereby a mixed nonnoble metal composite is formed at or near the ion-exchange sites of said zeolite.

14. The improved hydrocracking process of claim 13 wherein said crystalline aluminosilicate zeolite comprises the hydrogen form of a faujasite having a silica to alumina mol ratio greater than 3.

15. The process of claim 13 wherein said catalyst has been sulfactivated by contacting said catalyst composition with a sulfur-containing compound for a period of time prior to the completion of said hydrocracking reaction.

16. An improved selective catalytic dinitrogenation process comprising contacting a petroleum feedstock containing nitrogenous compounds with a catalyst composition comprising a mixed nonnoble metal component composited with a crystalline aluminosilicate zeolite having uniform pore diameters in the range from about 4 to about 15 Angstrom units, said catalyst composition being prepared by cation exchanging said crystalline aluminosilicate zeolite with a first nonnoble metal in the cationic form which first nonnoble metal is selected from the metal cations of the nonnoble metal constituents of Group VIII of the Periodic Table, and treating said cation exchanged zeolite with a second nonnoble metal which second nonnoble metal is selected from the group consisting of the oxides and sulfides of Group VI–B of the Periodic Table; said process being conducted at a temperature in the range between about 200 and 900° F., a pressure in the range between about 50 and 1500 p.s.i.g., a space velocity in the range between about 0.2 and 5 v./v./hr. and a hydrogen rate in the range between about 500 and 5000 s.c.f./b.; and recovering a product of substantially lower nitrogen content.

17. The process of claim 16 wherein said petroleum feedstock additionally contains sufur compounds and said recovered product essentially retains the same approximate sulfur content as was present in the feed.

References Cited
UNITED STATES PATENTS 3,236,762  2/1966  Rabo et al. _____ 208—111

DELBERT E. GANTZ, *Primary Examiner.*

UNITED STATES PATENT OFFICE
CERTIFICATE OF CORRECTION

Patent No. 3,392,108                                July 9, 1968

Ralph Burgess Mason et al.

It is certified that error appears in the above identified patent and that said Letters Patent are hereby corrected as shown below:

In the heading to the printed specification, line 5, "Roland Burgess Mason" should read -- Ralph Burgess Mason --.

Signed and sealed this 9th day of December 1969.

(SEAL)
Attest:

Edward M. Fletcher, Jr.                      WILLIAM E. SCHUYLER, JR.
Attesting Officer                             Commissioner of Patents